United States Patent
Lee, Jr. et al.

(10) Patent No.: US 6,784,806 B1
(45) Date of Patent: Aug. 31, 2004

(54) ELECTRONIC ELECTRICITY METER

(75) Inventors: Robert E. Lee, Jr., Rochester, NH (US); Mark R. Arsenault, Sanford, ME (US); Marjorie J. Mancuso, Stratham, NH (US); Virginia H. Zinkowski, E. Kingston, NH (US); Warren R. Germer, Hampton, NH (US); William O. Rector, Saratoga Springs, NY (US); Mark E. Hoffman, Rochester, NH (US); John J. Pazdon, Jr., Newmarket, NH (US); Larry A. Schmidt, Rochester, NH (US); Donald Naik, Beverly, MA (US); Melissa J. Pazdon, Dover, NH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/486,523

(22) PCT Filed: Jun. 28, 1999

(86) PCT No.: PCT/US99/14575

§ 371 (c)(1),
(2), (4) Date: Feb. 28, 2000

(87) PCT Pub. No.: WO00/00935

PCT Pub. Date: Jan. 6, 2000

Related U.S. Application Data (60) Provisional application No. 60/091,039, filed on Jun. 29, 1998.

(51) Int. Cl.⁷ ............................................. G08B 23/00
(52) U.S. Cl. ................. 340/870.02; 340/505; 370/346; 379/106.03; 324/142
(58) Field of Search ....................... 340/870.02, 870.03, 340/505, 870.31; 379/106.03; 370/346; 324/116, 142

(56) References Cited

U.S. PATENT DOCUMENTS

| | | | |
|---|---|---|---|
| 4,388,690 A | * | 6/1983 | Lumsden .................. 340/10.1 |
| 4,697,182 A | | 9/1987 | Swanson ................ 340/870.02 |
| 4,850,010 A | * | 7/1989 | Stanbury et al. ............. 340/505 |
| 4,902,965 A | * | 2/1990 | Bodrug et al. .............. 324/116 |
| 5,309,363 A | | 5/1994 | Graves et al. .............. 705/403 |
| 5,469,365 A | | 11/1995 | Diekema et al. ............. 702/62 |
| 5,677,947 A | * | 10/1997 | Oliver .................... 340/870.02 |
| 5,710,706 A | | 1/1998 | Märkl et al. ................. 702/403 |
| 5,742,512 A | | 4/1998 | Edge et al. .................... 702/57 |
| 6,246,677 B1 | * | 6/2001 | Nap et al. .............. 340/870.02 |

OTHER PUBLICATIONS

European Patent Office Supplementary Search Report.

* cited by examiner

Primary Examiner—Albert K. Wong
(74) Attorney, Agent, or Firm—Karl A. Vick, Esq.; Armstrong Teasdale LLP (57) ABSTRACT

An electronic electricity meter which, in one embodiment, includes a modem board, or unit, coupled to the meter microcomputer and exchanges information between the meter and a central computer is described. Using signals supplied by the meter microcomputer and the central computer, the modem unit microcomputer can determine whether to exchange information between the meter and the central computer and the proper time at which the information should be exchanged. In an exemplary embodiment, the modem unit detects various conditions within the meter and responds by exchanging information with the central computer at a proper, or pre-defined, time. The modem unit has two different basic modes, or states, of operation. These states of operation are sometimes referred to as the call originate mode and the call answer mode. Call originate refers to the mode of the unit when a condition occurs in meter 10 and information is being transmitted to the central computer from the modem unit utilizing a telephone line. The call is originated upon occurrence, for example of a power outage to the meter. In the call answer mode, the central computer originates a call to the meter. The central computer can then transfer information to the meter, for example a new program can be stored in the modem unit memory.

21 Claims, 6 Drawing Sheets

ELECTRONIC ELECTRICITY METER

This application claims priority of provisional application 60/091,039 filed Jun. 29, 1998.

BACKGROUND OF THE INVENTION

In many electronic electricity meters, communications with a meter microcomputer can be performed via an optical port or an option board connector. For example, in some known meters, an electrical connector is provided so that various option boards, such as a telephone modem communication board, may be electrically connected to the meter microcomputer. A central computer is often used to collect data, including billing information, from the meter, using the modem communication board. The data is available from the modem communication board in a predefined format (an ANSI defined protocol) on the communication channel which connects the option board connector to the meter microcomputer.

To reduce the number of nuisance and common event, e.g., power outage, calls, it is desirable to provide a modem unit, or board, which detects conditions within the meter and exchanges information with the central computer after the condition has existed for a pre-defined period of time. It also would be desirable to provide such a unit that would allow modification of the operation parameters. It would further be desirable to provide such a modem unit which can be easily and quickly coupled to a meter while allowing programming of a security password.

BRIEF SUMMARY OF THE INVENTION

These and other objects may be attained by an electricity meter which, in one embodiment, includes a modem circuit, or unit, coupled to the meter microcomputer which exchanges information between the meter microcomputer and a central computer of the data source. Using the signals supplied by the meter microcomputer and the central computer, the modem unit can detect various conditions within the meter and determine the proper time for exchanging the information. In one embodiment, the modem unit includes a microcomputer having a plurality of timers.

In one aspect, the present invention is directed to allowing the programming of meter and modem unit passwords. Specifically, the meter and modem unit are placed into a password recovery state upon detecting closure of an external switch. Closure of the external switch simultaneously places the meter and the modem unit into password recovery states so that new passwords may be programmed into the meter and the modem unit by the central computer. Such a configuration avoids the time and expense associated with reprogramming the modem unit at the meter shop or having to send a specially trained individual to the meter site to perform the reprogramming.

In another aspect, the present invention is directed to limiting the number of calls initiated from the meter. More specifically, the modem unit microcomputer detects certain events and waits a pre-defined period of time before initiating the call to the central computer. In one form, after the modem unit detects a power outage indicator from the meter microcomputer, the modem unit waits a programmable period of time prior to an outage call being placed to the central computer. The modem unit microcomputer may be further configured so that in order to initiate the call to the central computer several conditions must occur within a pre-defined period of time. If all of the events do not occur in the specified period of time, the call will not be made to the central computer.

In yet another aspect, the present invention is directed to the modem unit answering calls from the central computer. More specifically, and in accordance with one form, the meter modem unit receives new program information from the central computer. The modem unit microcomputer program is stored in a non-volatile memory having two segments. A new program is stored in an inactive segment of the memory while the modem unit microcomputer executes a program from the active segment. If the programming is completed, the microcomputer changes the inactive segment to the active segment and executes the new program. However, if the programming is not completed, the modem unit microcomputer will continue to execute the program stored in the active segment. The two segments ensure that the meter will not be left in a partially programmed mode.

In still another aspect, the present invention is directed to utilizing multiple meters configured in a master slave arrangement. Information is exchanged between the meters and the central computer utilizing a single telephone line. More specifically, each meter includes a modem unit having a unique identification number. Prior to exchanging information from the central computer, an identification number is transferred to the meters. Each modem microcomputer determines whether the transferred identification number matches the identification number stored in its memory. If the numbers match, that modem unit exchanges information with the central computer. Those meters which do not match the transferred identification number wait and listen for the next transferred identification number to determine whether a match exists.

The above described modem unit detects multiple conditions and responds to those conditions at the proper pre-defined time to reduce the number of nuisance and common event calls. New operation parameters may also be transferred to the modem unit to allow modification of the condition and time parameters. The modem unit described above allows the password to be reprogrammed and the user does not have to pre-program the modem unit. As result, a new modem unit may be quickly installed in a meter.

DETAILED DESCRIPTION OF THE INVENTION

Figure 1:
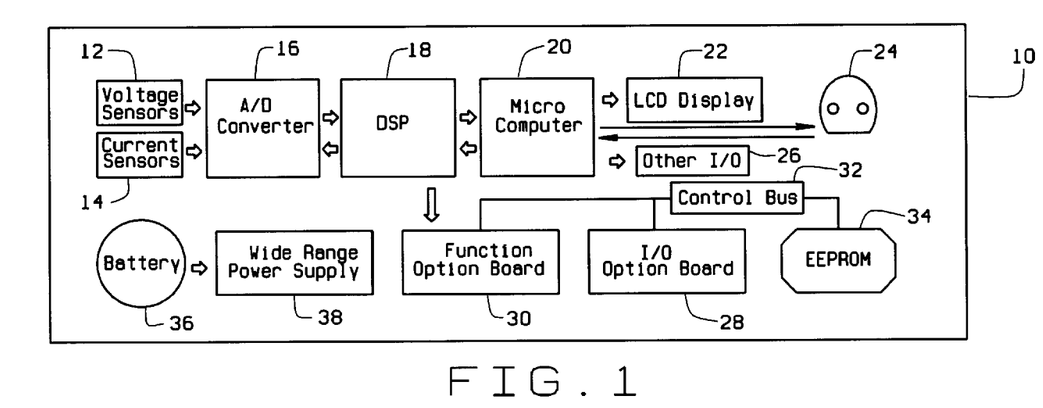
FIG. 1 is a block diagram of an electronic energy meter.

FIG. 1 is a block diagram illustration of an exemplary electronic energy meter 10 which, for example, is commercially available from General Electric Company, 130 Main Street, Somersworth, N.H. 03878, and generally referred to as the KV meter. The KV meter can be modified to incorporate the modem unit described below in more detail. Although the present apparatus and methods are described herein in the context of an electronic electricity meter, it should be understood that the present invention is not limited to practice with any one particular meter. The present invention can be utilized in connection with other microcomputer based meters.

Referring now specifically to FIG. 1, meter 10 includes voltage sensors 12 and current sensors 14. Sensors 12 and 14, in operation, typically are coupled to the power lines supplying power to site at which the meter is located. Sensors 12 and 14 are coupled to an analog to digital (A/D) converter 16 which converts the input analog voltage and current signal to digital signals. The output of converter 16 is provided to a digital signal processor (DSP) 18. DSP 18 supplies microcomputer 20 with digitized metering quantities, e.g., $V^2H$, $I^2H$. Microcomputer 20, using the metering quantities supplied by DSP 18, performs additional metering calculations and functions. DSP 18 may, for example, be a processor commercially available as Model Number TMS320 from Texas Instruments Company, P.O. Box 6102, Mail Station 3244, Temple, Tex. 76503, modified to perform metering functions.

Microcomputer 20 is coupled to a liquid crystal display 22 to control the display of various selected metering quantities and to an optical communications port 24 to enable an external reader to communicate with computer 20. Port 24 may be the well known OPTOCOM™ port of General Electric Company, 130 Main Street, Somersworth, N.H. 03878, which is in accordance with the ANSI type II optical port. Microcomputer 20 may also generate additional outputs 26 used for various other functions as is well known in the art. Microcomputer 20 may, for example, be an eight bit microcomputer commercially available from Hitachi America, Inc., Semiconductor & I.C. Division, Hitachi Plaza, 2000 Sierra Point Parkway, Brisbane, Calif. 94005-1819, modified to perform metering functions.

Microcomputer 20, in one embodiment, also is coupled to an input/output (I/O) board 28 and to a function, or high function, board 30. DSP 18 also supplies outputs directly to high function board 30. Microcomputer 20 further is coupled, via a control bus 32, to an electronically erasable programmable read only memory (EEPROM) 34. I/O board 28 and high function board 30 also are coupled, via bus 32, to EEPROM 34.

Back-up power is supplied to the meter 10 by a power outage battery 36 coupled to a wide range power supply 38. In normal operation when no back-up power is required, power is supplied to the meter components from the power lines via power supply 38.

Many functions and modifications of the components described above are well understood in the metering art. The present application is not directed to such understood and known functions and modifications. Rather, the present application is directed to the methods and structures described below in more detail. In addition, although the methods and structures are described below in the hardware environment shown in connection with FIG. 1, it should be understood that such methods and structures are not limited to practice in such environment. The subject methods and structures could be practiced in many other environments.

Further, it should be understood that the present invention can be practiced with many alternative microcomputers, and is not limited to practice in connection with just microcomputer 20. Therefore, and as used herein, the term microcomputer is not limited to mean just those integrated circuits referred to in the art as microcomputers, but broadly refers to microcomputers, processors, microcontrollers, application specific integrated circuits, and other programmable circuits.

Figure 2:
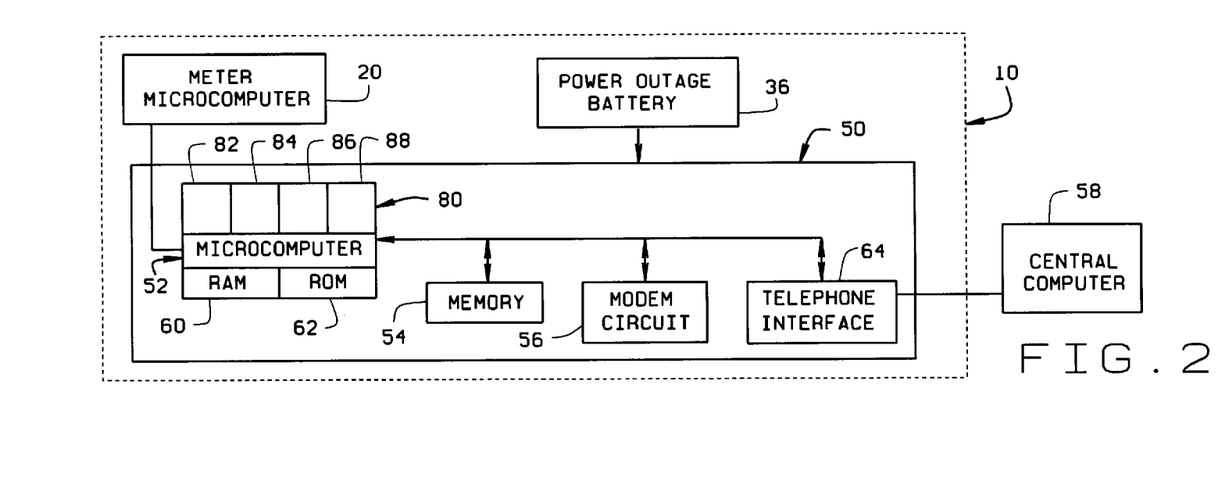
FIG. 2 is a block diagram of a modem unit in accordance with one embodiment of the present invention.

FIG. 2 is a block diagram of an exemplary modem circuit, or unit, 50 in accordance with one embodiment of the present invention. Generally, unit 50 couples to meter microcomputer 20 as described below in more detail and at least based in part on the signals present at unit 50, unit 50 can determine whether meter 10 should take any action as described below.

Referring now specifically to FIG. 2, unit 50 includes a microcomputer 52 coupled to meter microcomputer 20, a memory 54, and a modem circuit 56. Unit 50 provides a communication path, or link, for exchanging data, or information, between meter 10 and a central computer 58. Microcomputer 52 includes, in one embodiment, a random access memory (RAM) 60 and a read only memory (ROM) 62. Programmed parameters and operating information, or data (not shown), are stored in memory 54. Memory 54 may, for example, be a non-volatile memory device such as an electrically erasable read only memory (EEPROM), although other types of non-volatile memory devices may be used. Modem circuit 56 may, for example, be a modem chipset commercially available as Model Number RC224AT from Rockwell International Corp., Digital Communications Division, 4311 Jamboree Road, Newport Beach, Calif. 92660.

Command, response, and communication data are exchanged between microcomputer 52 and modem circuit 56. A telephone interface circuit 64 couples modem circuit 56 to a telephone line 66 so that information may be remotely exchanged between meter 10 and central computer 58. In one embodiment, modem unit microcomputer includes a timer circuit 80 having a plurality of timer circuits for measuring time. Timer circuit 80 includes a real-time clock 82, an outage timer 84, an outage delay timer 86, and a call delay timer 88. Real-time clock 82 generates a time value representative of the current time and date, e.g., HH:MM:SS, MM/DD/YY. Timers 84, 86, and 88 are used for measuring the amount of time that has passed since a certain event, or occurrence of a condition. Timers 84, 86, and 88 may be programmed with an initial value and may increment or decrement in value and produce a signal when the programmed time has passed or elapsed. In an alternative embodiment, timer circuit 80 may be separate and distinct from modem unit microcomputer 52.

To exchange information between meter 10 and central computer 58, and in one embodiment, a data exchange algorithm is loaded into modem unit 50. Specifically, the algorithm is loaded, and stored, in memory 62. The algorithm is then executed by microcomputer 52.

Figure 3:
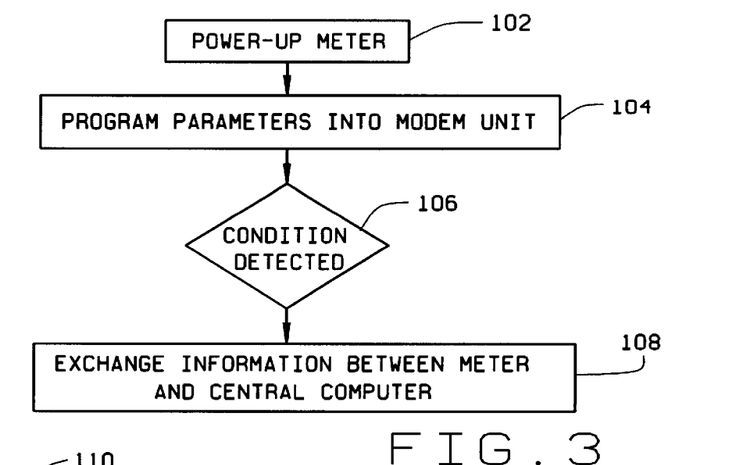
FIG. 3 is a flow chart of operation of the meter in accordance with one embodiment of the present invention.

A flow chart 100 illustrating process steps executed by microcomputer 52 in exchanging information between meter 10 and central computer 58 is set forth in FIG. 3. More particularly, upon power up 102 of meter 10, or anytime after power is applied to meter 10, various parameters are programmed 104 into memory 54. In one embodiment, the parameters include initial values for timer circuits 80, specifically, initialization of timers 84, 86, and 88, whether an outage call should be placed, how long should meter 10 wait before placing call, and whether meter 10 should answer a call from the central computer 58. In addition, after the parameters are programmed and power is applied to meter 10, outage delay timer 86 is started.

Figure 4:
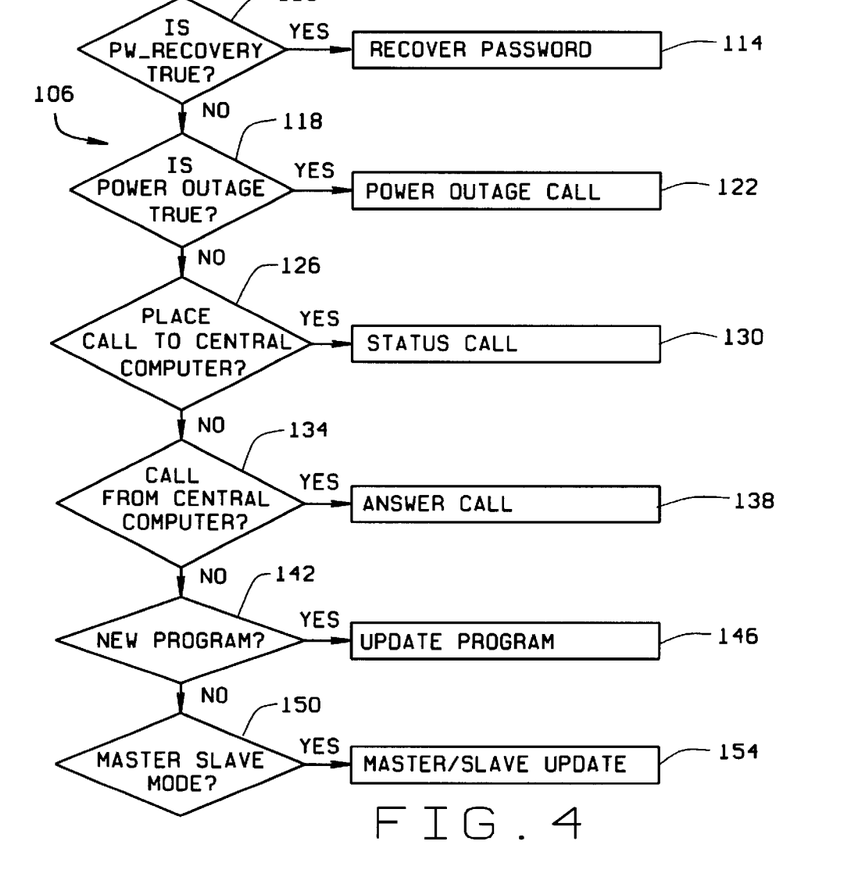
FIG. 4 is a flow chart illustrating a sequence of process steps for detecting a condition in an electronic electricity meter.

After programming parameters 104, microcomputer 52 monitors operations of meter 10 to determine, or detect, whether a condition exists, or a change has occurred 106 in the signals provided to modem unit 50. The conditions include an error, a caution, and a diagnostic condition. If a condition is detected 106, information is transferred, or exchanged, 108 using modem unit 50. Particularly, microcomputer 52 detects modifications of signals provided from meter microcomputer 20 to modem microcomputer 52 and in the signals provided from central computer 58. More specifically as shown in FIG. 4, microcomputer 52 detects 106 at least the following the conditions or changes and exchanges 108 the indicated information.

| Detect Condition 106 | Information Exchange 108 |
| --- | --- |
| 1. Password Recovery 110 | Recover password 114. |
| 2. Power outage 118 | Power outage call 122. |
| 3. Scheduled Status Report 126 | Status Call 130 |
| 4. Call from central computer 134 | Answer Call 138. |
| 5. New Program 142 | Update Program 146. |
| 6. Master/Slave mode 150 | Master/Slave Update 154. |

Password Recovery and Recover Password

Password recovery 110 and recover password 112 refer to detecting a password recovery state and enabling programming of modem unit 50 password and meter 10 password. In one embodiment, an external switch, oerable by a user, generates a PW_Recovery signal that is supplied to modem unit 50 from meter microcomputer 20. The PW_Recovery signal is supplied to microcomputer 52 in a low to high state to enable the programming of the passwords. More particularly, and referring to FIG. 5, recovering password 114 includes disabling the password security 200 of modem unit 50 and placing modem unit 50 in a password recovery state 202. Disabling security 200 allows microcomputer 52 of modem unit 50 to continue to operate without having a password that matches the meter password. After modem unit 50 is placed in the recovery state 202, the same password is stored 204 in meter 10 and modem unit 50. Specifically, the passwords transmitted from central computer 58 to meter 10 utilizing modem unit 50. The passwords are then programmed in meter microcomputer 20 and modem unit memory 54. Upon completion of programming the new passwords into microcomputer 20 and memory 54, the PW_Recovery signal supplied to microcomputer 52 is changed to a false, or low state by meter microcomputer 20. Password security of modem unit 50 is enabled 208 after modem unit 50 receives the new passwords.

Figure 5:
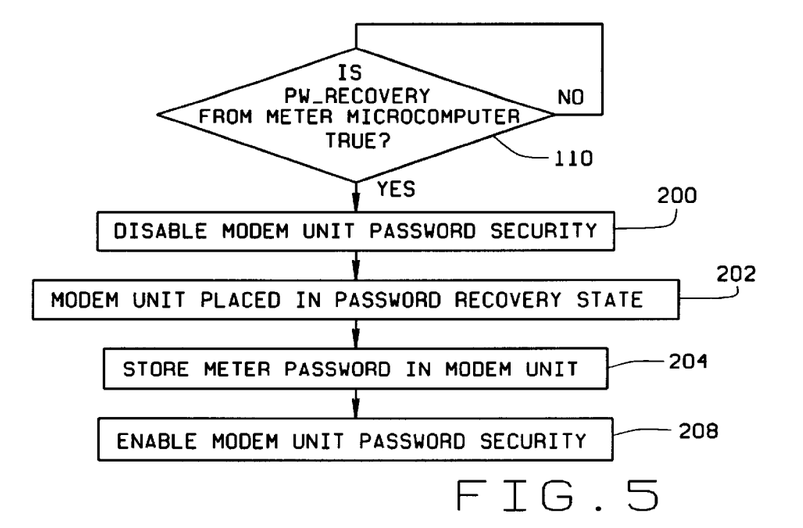
FIG. 5 is a flow chart illustrating a sequence of process steps for detecting a password recovery state in an electronic electricity meter.

For example, if a new modem unit 50 is installed and coupled to a microcomputer 20, the meter password and the modem unit password would not match, therefore, meter 10 may not be able to be programmed to extend the functionality of meter 10. As a result of recover password 114, modem unit 50 and microcomputer 20 will have matching passwords.

Power Outage and Power Outage Call

Figure 6:
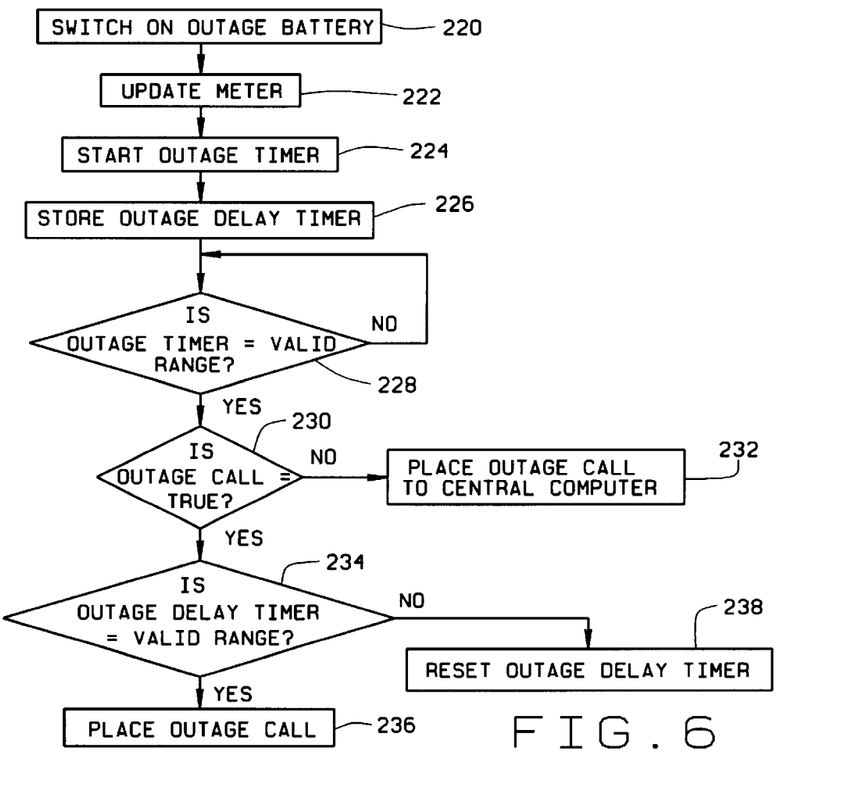
FIG. 6 is a flow chart illustrating a sequence of process steps for detecting a power outage state in an electronic electricity meter.

Power outage 118 and power outage call 122 refers to notifying central computer 58 when the power is removed from meter 10. A power outage signal is supplied to modem unit 50 from meter microcomputer 20 to indicate that power has been removed from meter 10. Specifically, the power outage signal supplied by microcomputer 20 changes from a false state, to a true state when power is removed from meter 10. More specifically and as shown in FIG. 6, upon microcomputer 52 detecting power outage 118, power is supplied 220 to microcomputer 52 from outage battery 36. Microcomputer 52 updates 222 a meter status signal which is stored in memory 54. Outage timer 84 is then started 224 and the outage delay timer is stopped and the value stored 226 in memory 54. The value of outage timer 84 is then monitored 228 using microcomputer 54 to determine whether the value of outage timer 84 is within a valid range. If power is not restored to meter 10 prior to the value of outage timer 84 being within the valid range, microcomputer 52 examines 230 previous outage call completed parameter stored in memory 54 to determine whether an outage call should be placed. If the previous outage call completed parameter stored in memory 54 is in a false state, a call is placed 232 to central computer 58 as described below. If, however, the previous outage call completed parameter is in a true state, microcomputer 52 examines 234 the value of outage delay timer 86 stored in memory 54 to determine whether the value is within a predefined, or valid range. If the value is within the predefined range, a call is placed to central computer 58. If, however, the value is outside the valid range, microcomputer 52 resets 238 outage delay timer 86 and waits for power to be applied to meter 10.

Outage timer 84 and outage delay timer 86 may be configured to avoid nuisance outages calls caused by power transients and to alter the timing of outage calls from different meters in a common outage area. Specifically, outage timer 84 may be configured to prevent calls from being made to central computer 58 until a specific amount of time has passed. In one embodiment, outage timer 84 is programmed with a value between 0, indicating no delay, and 255 seconds. If the value is programmed with a non-zero value, power must be removed from meter 10 at least for that period, or valid range, of time, before microcomputer 52 proceeds. For example, in one embodiment, diagnostic tests, or checks, are delayed a selectable period of time to allow stabilization of supplying power and meter 10. In another embodiment, calls to central compute 58 are prevented until the selected period of time for stabilization has passed.

The value of outage timer 84 is altered to prevent nuisance calls from being generated from power outages having a duration less than the programmed value of timer 84. In addition, outage delay timer 86 may be configured to prevent nuisance calls from transient conditions. For example, typical outages may consist of a series of power transitions before power is completely lost and short outages may occur during normal operation due to wind blown power lines or other relatively brief disturbances. Additionally, the process of repairing local power distribution faults often produces several brief power restorations, followed by a loss of power, before power is restored permanently. In order to avoid multiple calls from being made from a plurality of meters, outage timer 84 and outage delay timer 86 may be configured to require that power be removed for a predefined period of time and meter 10 to have power applied for a valid range of time before an outage call is made. Specifically, if the values of both timers 84 and 86 are not within their respective valid ranges a call will not be placed to central computer 56.

Figure 7:
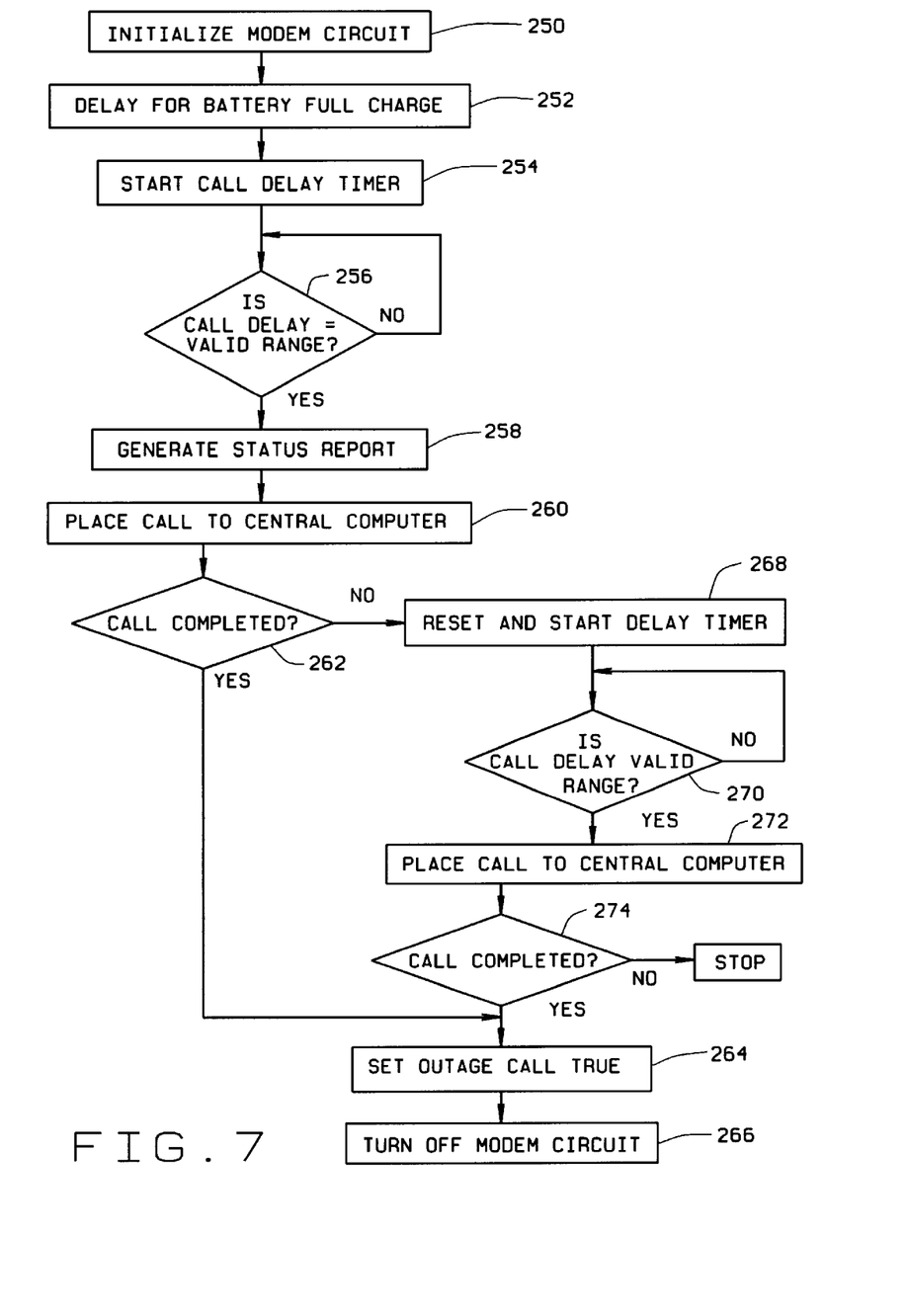
FIG. 7 is a flow chart illustrating a sequence of process steps for placing an outage call in an electronic electricity meter.

Referring to FIG. 7, in placing a call 236 to central computer 58, microcomputer 52 initializes 250 modem circuit 56. Initialization 250 includes configuring circuit 56 to originate a call to central computer 58, defines a phone number to call for central computer 58, and defining parameters related to the baud rate, type of handshaking and other communication parameters as known in the art. If the outage call parameter is in a true state indicating that a call is to be made during a power outage condition, microcomputer 52 delays 252 a defined period of time for outage battery 36 to reach full charge. Call delay timer 88 is started 254 and microcomputer 52 monitors 256 call delay timer 88 until the value of call timer equals the value, or valid range, defined during programming of parameters 104. When the value of call delay timer is within the valid range, a status report is generated 258 by microcomputer 52 and a call is placed 260 to central computer 58 utilizing modem circuit 56. After the status report is generated 258, modem circuit 56 supplies the status report to telephone interface 64 and telephone line 66 so that the status report is transferred to central compute 58. If a call is completed 262, modem circuit 56 supplies 264 an outage call completed signal to microcomputer 52 and power is removed 266 from modem circuit 56.

If the call is not completed, call delay timer 88 is reset and started 268. Upon microcomputer 52 detecting 270 call delay timer 88 being within a valid range, a second call is placed 272 to central computer 58. The second call may be placed to the same phone number as described above, or may be placed to a second phone number for central computer 58. As described above, if microcomputer 52 detects 274 that the second call was completed, modem circuit 56 supplies 262 the outage call completed signal to microcomputer 52 and power is removed 264 from modem circuit 56. If the call is not completed, modem unit 50 is stopped and waits for power to be applied to meter 10. Additional configurations may also be included, e.g., meter 10 may attempt any number of calls and any number of different numbers prior to stopping.

Figure 8:
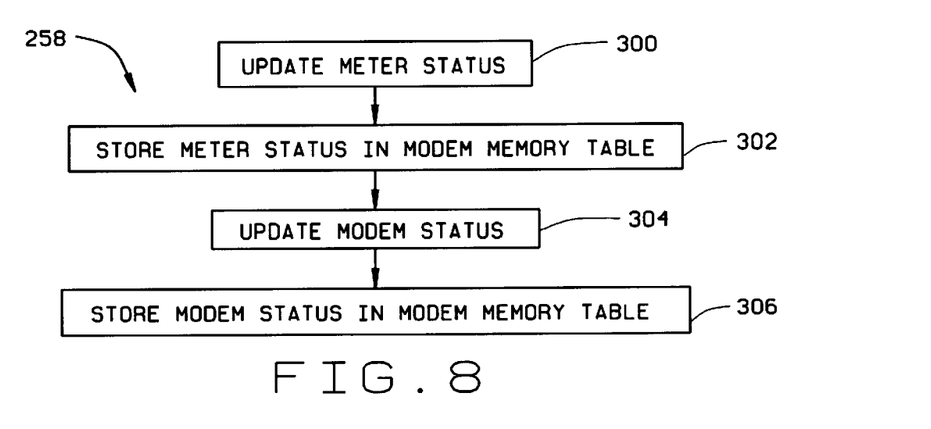
FIG. 8 is a flow chart illustrating a sequence of process steps for generating a status report in an electronic electricity meter.

In one embodiment and as shown in FIG. 8, the status report generated 258 includes transferring status information, or data, from two tables stored in memory 54. Specifically, microcomputer 20 periodically executes a diagnostic, or test routine to update 300 status of meter 10. The results of the diagnostic routine is transferred from microcomputer 20 to microcomputer 52 and stored 302 in a meter status table in memory 54. A modem unit status routine is executed by microcomputer 52 to update 304 status of modem unit 50. The resulting modem unit status is stored in a modem status table in memory 54. The status report generated 258 for transfer to central computer 58, includes the contents of the meter status table and the modem unit status table.

In another aspect of the present invention, in order to reduce the power consumption of outage battery 36, outage battery 36 powers only modem unit 50 during a power outage. Specifically, in the event of a power outage, before placing 260 call to central computer 58, microcomputer 52 updates the modem status table and stores the updated status in memory. Then, unneeded circuitry is placed in a low power sleep mode, until the outage call is placed. Once modem unit 50 is connected to central computer 58, the status report, including all required status information is exchanged with to central computer 58 by transferring the meter status table and the modem status table. As a result, the time required to transmit the information is reduced which reduces power consumption of outage battery 36.

In another aspect of the present invention and in one embodiment, a statistics communication algorithm is loaded in central computer 58. Specifically, the algorithm is loaded, and stored, in a memory of central computer (not shown). The algorithm is then executed by a microcomputer, or microprocessor (not shown) in central computer 58. The central computer microcomputer records statistical data related to the information exchanged between meter 10 and central computer 58. The statistical data includes status information and error information. Status information is data concerning general byte counts and data packet counts. Error information is data specifically relating the number of errors, the number of bytes associated with an error, and the number of data packets associated with the errors. At the end of exchanging information between meter 10 and central computer 58, central computer microcomputer analyzes the statistical data. If certain portions of the data meet a previously established error criteria, then the data is stored in central computer 58. The algorithm allows only data of interest to be stored thereby saving storage space and analysis time.

In another aspect of the invention, in order to prevent all meters in an outage area from calling central computer 58 at the same time, the valid range of call delay timer .88 may be unique to each meter 10. In one embodiment, a random delay is generated for each meter 10. The random delay is based on the generation of a random number in a specific range from an encrypted serial number seed, or initial value. For example, in one embodiment, the valid range of call delay timer 84 is based on the unique serial number of meter 10. Using the meter serial number, microcomputer 52 generates a valid range for outage timer 84. Specifically, microcomputer 52 utilizes the encrypted serial number to generate the valid range for outage timer 84. The nature of the encryption is such that two encrypted serial numbers generated from two consecutive meter serial numbers will generate very different valid ranges for outage timer 84. As a result, meters in the outage area generate outage calls at different times. The valid range of each meter 10 may be programmed to include any valid range.

Scheduled Call Detect and Scheduled Call

Scheduled call detect 126 and scheduled call 130 refer to detecting whether the current time, as defined by real-time clock 82, is within a programmed, or pre-defined valid range. If the value of real-time clock 82 is within the valid range, the status report, as described above, is transferred to central computer 58. Specifically, to transfer the status report, including billing information, to central computer 58, real-time clock 82 is monitored to determine whether the current time matches a value stored in memory 54. The scheduled call time value may be defined to specify a certain time, day, day of the week, day of the month, or a combination thereof. Upon detecting 126 real-time clock 88 being within the valid range, modem unit 50 initiates a call to central computer 58 as described above. The status report, including the billing information, is then transferred to central computer 58.

Call from Central Computer and Answer Call

Figure 9:
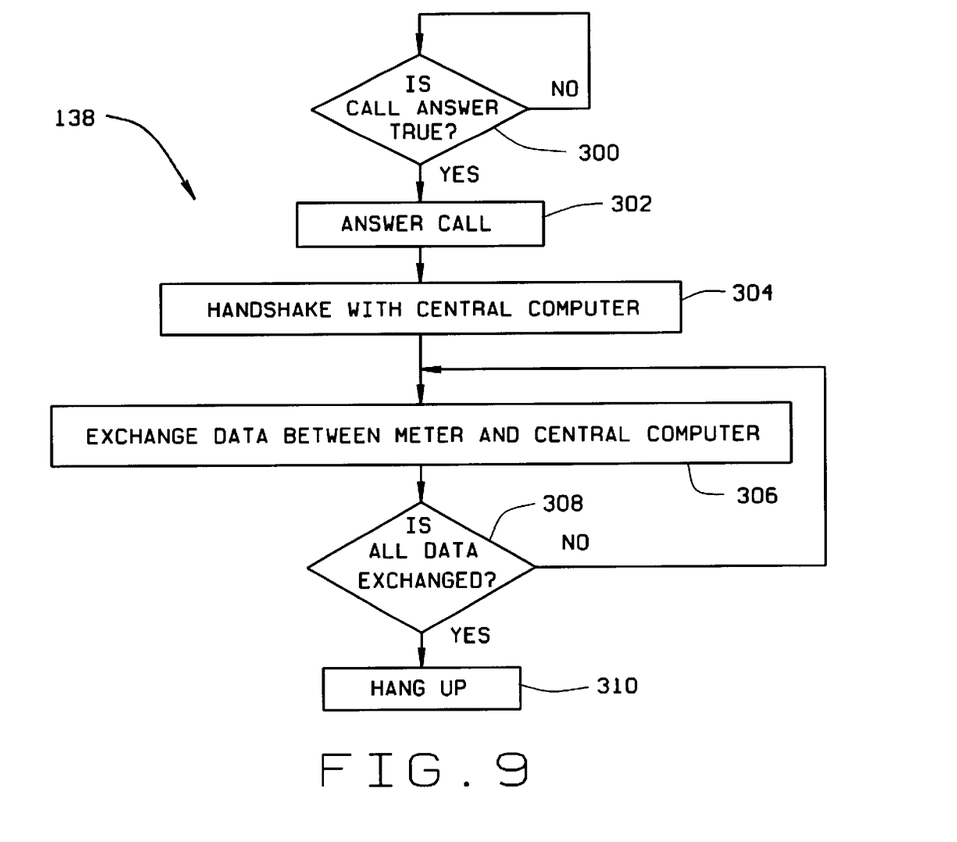
FIG. 9 is a flow chart illustrating a sequence of process steps for call answer state in an electronic electricity meter.

Call from central computer 130 and Answer Call 138 refer to central computer 58 originating a call to meter 10. Specifically, and as shown in FIG. 9, central computer 58 initiates a call to meter 10 utilizing telephone line 66. Upon detecting call, telephone interface supplies an incoming call signal to microcomputer 52. If a call answer parameter is detected 300 in a true, or high state, microcomputer 52 supplies a call answer signal to telephone interface 64 and modem circuit 56 so that the call is answered 302. After answering the call from central computer 58, modem circuit 56 performs handshaking 304 with central computer 58 so that data may be exchanged 306 between central computer 58 and meter 10. Data continues to be exchanged 306 until the completion 308 of the exchange at which time modem circuit 56 and central computer 58 each hang up 310 and the call is terminated.

New Program and Update Program

New program 142 and update program 146 refer to transmitting a new program to meter 10 from central computer 58. The new program is transmitted from central computer 58 to meter 10 so that the new program is stored in modem unit 50. More specifically, the new program is transferred from central computer 58 to modem unit 50 to alter operation of meter 10. For example, the new program may alter the time of the next scheduled call, the valid ranges for timer circuits 80 and the call answer parameters, The new program may also provide new phone numbers for calling central computer 58.

In one embodiment, the new program is stored in memory 54 including two segments. Prior to receiving the new program from central computer 58, the two segments are defined as an active segment containing the most recently programmed data, or program and an inactive segment containing previously programmed data. When a new program is received, the new program data is stored in the inactive segment. If the programming session is successfully completed, a programming complete signal is changed from the initialized low, or false state to a true, or high state, and sent from microcomputer 52 to modem circuit 56. If the programming complete signal is detected to be in a high state the current active segment is changed to the inactive and the current inactive segment is changed to the active segment.

If the programming is not completed and the programming complete signal does not transition to a high state, a loss of program call may be initiated to central computer so that the programming can be completed. When central computer 58 places call to meter 10, the original active and inactive segments designations will be unchanged because the new program was not successfully completed. As a result the modem unit 50 will always have a valid program, including operating parameters, so that unit 50 can continue to function properly.

Master/Slave Call and Master/Slave Update

Figure 10:
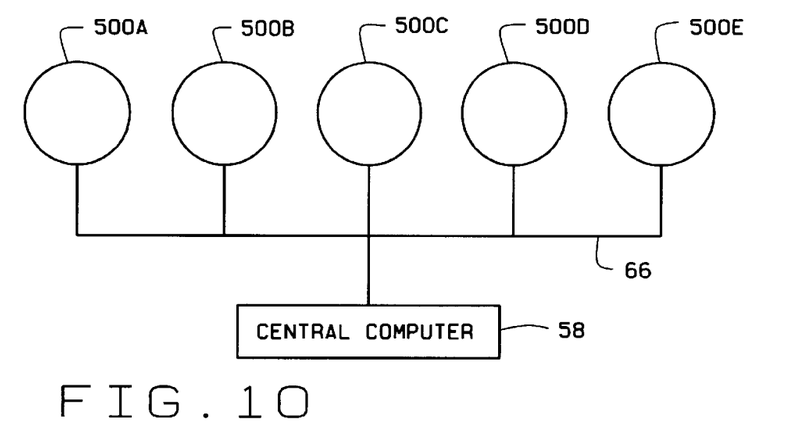
FIG. 10 is a block diagram of a master/slave configuration in accordance with one embodiment of the present invention.

Master/Slave Call 158 and Master/Slave Update 162 refer to placing a call to a group of at least two meters coupled to central computer 58 utilizing a single phone line 66. Specifically and as shown in FIG. 10, meters 500A, 500B, 500C, 500D, and 500E are coupled to central computer 58 utilizing a single telephone line 66. One meter, for example meter 500A, is designated as a master meter, while the remaining meters, 500B, 500C, 500D, and 500E are designated as slave meters. Each meter includes a unique identification number, for example stored in memory 54. Information, or data, is exchanged between central computer 58 and meters 500A, 500B, 500C, 500D, and 500E utilizing telephone line 66.

Figure 11:
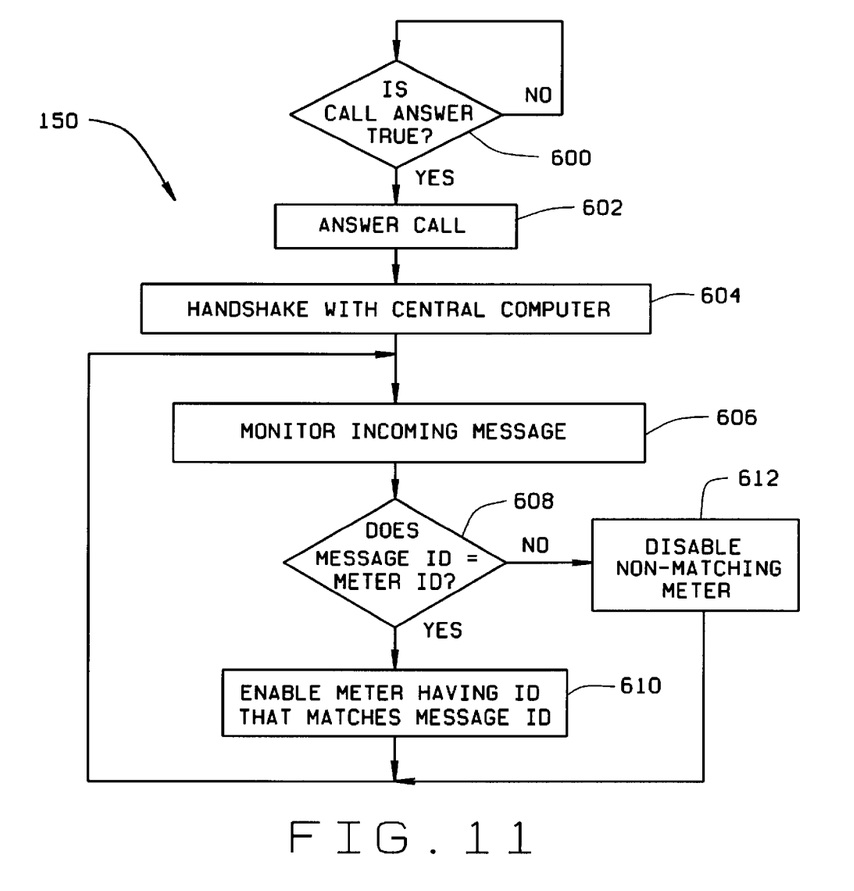
FIG. 11 is a flow chart illustrating a sequence of process steps for a master/slave configuration of an electronic electricity meter.

Referring to FIG. 11, when a phone call from central computer 58 is directed to meters 500A, 500B, 500C, 500D, and 500E utilizing phone line 66, meters 500A, 500B, 500C, 500D, and 500E answer 602 call. Specifically, after master meter 500A handshakes 604 with central computer 58, meters 500A, 500B, 500C, 500D, and 500E each monitor 606 an incoming message, or data packet transferred from central computer 58. The incoming message includes an identification number that corresponds to one of meters 500A, 500B, 500C, 500D, and 500E. Meters 500A, 500B, 500C, 500D, and 500E each determine 608 whether the transmitted identification number corresponds to the identification number stored in memory 54 of each meter. If the transmitted identification number matches the unique identification number stored in a meter, a transmit line of modem unit 50 of the meter matching the identification number is enabled 610 and transmit lines of modem units of all non-matching meters are disabled 612. For example, if the identification number matches the identification number of meter 500C, the modem unit transmit lines of meters 500A, 500B, 500D, and 500E will be disabled. After information is exchanged between central computer 58 and enabled meter 500C, meters 500A, 500B, 500C, 500D, and 500E monitor 606 the next incoming message. This routine continues until central computer 58 terminates the call and hangs up.

In addition, the master/slave configuration allows meters 500A, 500B, 500C, 500D, and 500E to initiate a call to central computer 58 as described above using meter 10. Specifically, upon detecting a condition 106, one of meters 500A, 500B, 500C, 500D, and 500E initiates the call to central computer 58. In one embodiment, meters 500A, 500B, 500C, 500D, and 500E are configured so that each meter has a unique valid range for timer circuit 80 parameters and schedule time valid range. For example, to prevent meters 500A, 500B, 500C, 500D, and 500E from originating calls without interrupting each other, meters 500A, 500B, 500C, 500D, and 500E can be programmed to initiate calls only during a specific time window, e.g., meter 500A, 10:00 AM–10:15 AM on Oct. 21, 1998, meter 500B, 10:16 AM–10:30 AM on Oct. 22, 1998, 500C, 10:45 AM–10:59 AM on Oct. 22, 1998 500D, 10:16 AM–10:30 AM on Oct. 23, 1998 and 500E, 10:16 AM–10:30 AM on Oct. 24, 1998. Each meter has a unique time window for originating the call to central computer 58.

Further, for events likely to occur simultaneously all meters within a the group, or cluster, e.g., a power failure, meters 500A, 500B, 500C, 500D, and 500E can be configured so that only one meter originates a call to central computer 58. Specifically, an initiate call parameter can programmed into modem unit 50 so that microcomputer 52 is disabled from initiating call to central computer 58.

The above described modem unit exchanges information between the meter and the central computer upon the occurrence of a condition within the meter. The modem unit microcomputer then evaluates the condition against parameters stored in memory 54. Using additional parameters, the microcomputer can then determine whether the information should be exchanged between the central computer and the meter. Also, the modem unit is configured to determine the proper time for exchanging the information between the central computer and the meter. Such modem unit is believed to reduce the number of nuisance type calls to central computer. Further, the modem unit is configured to allow the meter to remain operational despite error type conditions.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation.

Accordingly, the spirit and scope of the invention are to be limited only by the terms of the appended claims.

While the invention has been described in terms of various specific embodiments, those skilled in the art will recognize that the invention can be practiced with modification within the spirit and scope of the claims.

What is claimed is:

1. A method of programming an electricity meter comprising a microcomputer and a modem, said method comprising the steps of:

programming the meter;

determining whether the meter programming is completed; and if the meter programming is completed, then providing a programmed signal from the microcomputer to the modem.

2. A method in accordance with claim 1 wherein the programmed signal provided to the meter changes from a first state to a second state if the meter programming is completed.

3. A method in accordance with claim 2 wherein if the programmed signal remains in the first state, then the meter initiates a loss of program call to a central computer.

4. A method in accordance with claim 1 wherein the meter modem comprises a non-volatile memory having two segments and wherein programming the meter comprises the step of determining whether programming data was last stored in the first segment or the second segment of the memory.

5. A method in accordance with claim 4 wherein if the programming data was last stored in the first segment said method comprises the step of setting a segment signal to a first state.

6. A method in accordance with claim 5 wherein if the programming data was last stored in the second segment said method comprises the step of setting the segment signal to a second state.

7. A method in accordance with claim 6 further comprising the step of:

determining whether the segment signal is in a first state; and if the segment signal is in the first state, then executing a program stored in the memory first segment.

8. A method in accordance with claim 7 further comprising the step if the segment signal is in the second state, then executing a program stored in the memory second segment.

9. A programmable electronic electricity meter comprising a microcomputer and a modem coupled to a central computer, said meter configured to:

receive programming data from the central computer utilizing said modem to program the meter;

determine whether said meter programming is completed; and if the meter programming is completed, then provide a programmed signal from said microcomputer to said modem.

10. A meter in accordance with claim 9 wherein said programmed signal provided to said modem changes from a first state to a second state if said meter programming is completed.

11. A meter in accordance with claim 10 wherein if the programmed signal remains in the first state, then said meter initiates a loss of program call to a central computer.

12. A meter in accordance with claim 9 wherein said meter modem comprises a non-volatile memory having at least two segments and wherein to program said meter, said meter is configured to determine whether programming data was last stored in a first segment or a second segment of said modem memory.

13. A meter in accordance with claim 12 wherein said meter is configured to set a segment signal to a first state if the programming data was last stored in said first segment.

14. A meter in accordance with claim 13 wherein said meter is configured to set said segment signal to a second state if the programming data was last stored in said second segment.

15. A meter in accordance with claim 14 further configured to:

determine whether said segment signal is in said first state; and if the segment signal is in said first state, then execute a program stored in said memory first segment.

16. A meter in accordance with claim 15 further configured to execute a program stored in said memory if said segment signal is in said second state.

17. A method of programming an electricity meter comprising a non-volatile memory having two segments, said method comprising the steps of:

programming the electricity meter to perform electricity metering functions; and determining whether programming data was last stored in the first segment or the second segment of the memory.

18. A method in accordance with claim 17 wherein if the programming data was last stored in the first segment said method comprises the step of setting a segment signal to a first state.

19. A method in accordance with claim 17 wherein if the programming data was last stored in the second segment said method comprises the step of setting the segment signal to a second state.

20. A method in accordance with claim 18 further comprising the steps of:

determining whether the segment signal is in the first state; and if the segment signal is in the first state, then executing a program stored in the memory first segment.

21. A method in accordance with claim 19 further comprising the steps of:

if the segment signal is in the second state, then executing a program stored in the memory second segment.

* * * * *

UNITED STATES PATENT AND TRADEMARK OFFICE
CERTIFICATE OF CORRECTION

| | |
|---|---|
| PATENT NO. | : 6,784,806 B1 |
| APPLICATION NO. | : 09/486523 |
| DATED | : August 31, 2004 |
| INVENTOR(S) | : Lee, Jr. et al. |

It is certified that error appears in the above-identified patent and that said Letters Patent is hereby corrected as shown below:

In Claim 1, column 11, lines 8 through 17, delete "A method of programming an electricity meter comprising a microcomputer and a modem, said method comprising the steps of:
programming the meter; determining whether the meter programming is completed; and if the meter programming is completed, then providing a programmed signal from the microcomputer to the modem." and insert therefor -- A method of programming an electricity meter comprising a voltage sensor, a current sensor, a microcomputer and a modem wherein the voltage sensor and the current sensor are each coupled to power lines supplying power to a site at which the electricity meter is located, said method comprising the steps of: programming the electricity meter to perform metering functions;
determining whether the electricity meter programming is completed; and if the electricity meter programming is completed, then providing a programmed signal from the electricity meter microcomputer to the electricity meter modem --.

In Claim 9, column 11, lines 49 through 58, delete "A programmable electronic electricity meter comprising a microcomputer and a modem coupled to a central computer, said meter configured to:
receive programming data from the central computer utilizing said modem to program the meter;
determine whether said meter programming is completed; and
if the meter programming is completed, then provide a programmed signal from said microcomputer to said modem." and insert therefore -- A programmable electronic electricity meter comprising a voltage sensor, a current sensor, a microcomputer and a modem coupled to a central computer wherein the voltage sensor and the current sensor are each coupled to power lines supplying power to a site at which the electricity meter is located, said meter configured to: receive electricity meter programming data from the

UNITED STATES PATENT AND TRADEMARK OFFICE
CERTIFICATE OF CORRECTION

PATENT NO. : 6,784,806 B1
APPLICATION NO. : 09/486523
DATED : August 31, 2004
INVENTOR(S) : Lee, Jr. et al.

It is certified that error appears in the above-identified patent and that said Letters Patent is hereby corrected as shown below:

central computer utilizing said electricity meter modem to program the electricity meter; determine whether said electricity meter programming is completed; and if the electricity meter programming is completed, then provide a programmed signal from said electricity meter microcomputer to said electricity meter modem. --

Signed and Sealed this

Twenty-fifth Day of March, 2008

JON W. DUDAS
*Director of the United States Patent and Trademark Office*